United States Patent [19]

Picquendar et al.

[11] 3,875,024

[45] Apr. 1, 1975

[54] METHOD OF MANUFACTURING A MASTER DESIGNED FOR THE REPRODUCTION OF RECORDS READABLE OPTICALLY BY DIFFRACTION

[75] Inventors: Jean Edgar Picquendar; Eugene Duda; Michel Marchal, all of Paris, France

[73] Assignee: Thomas-Brandt, Paris, France

[22] Filed: June 26, 1974

[21] Appl. No.: 483,434

[30] Foreign Application Priority Data

June 29, 1973 France ............................ 73.24003

[52] U.S. Cl. .......................... 204/5, 117/8, 264/106

[51] Int. Cl. ........................ B29d 17/00, G11b 3/70

[58] Field of Search .............. 204/5, 15, 6; 264/106; 117/8

[56] References Cited

UNITED STATES PATENTS

| | | | |
|---|---|---|---|
| 1,448,792 | 3/1923 | Cole | 204/5 |
| 1,513,120 | 10/1924 | Madsen | 204/5 |
| 2,067,502 | 1/1937 | Pollard et al. | 204/5 |
| 2,075,646 | 3/1937 | Hewitt | 204/5 |
| 3,227,634 | 1/1966 | Rinzema | 204/5 |

*Primary Examiner*—T. M. Tufariello
*Attorney, Agent, or Firm*—Cushman, Darby & Cushman

[57] ABSTRACT

The present invention relates to the manufacture of masters intended for the reproduction of records which comprise a succession of diffractive elements arranged in accordance with a track which can be optically read-out. The method consists in selectively volatilising, with a modulated radiation, a conductive mask deposited upon an electrically insulating substrate, in electroplating over the perforations of said mask for capping each perforation.

10 Claims, 6 Drawing Figures

METHOD OF MANUFACTURING A MASTER DESIGNED FOR THE REPRODUCTION OF RECORDS READABLE OPTICALLY BY DIFFRACTION

The present invention relates to the dissemination of information through the medium of a physical carrier or record which makes it possible to store the information and ultimately retrieve it by playback through an appropriate read-out device. It relates more particularly to the process by which it is possible, from an electrical signal carrying said information, to produce a sufficiently fine and resistant impression to act as a master at the time of the mass reproduction of records, for example by pressing. In the case of records designed for optical read-out, the impression obtained consists of a track of substantially constant width arranged at the surface of a flexible or rigid carrier. This track is formed by a succession of diffractive projecting or hollow elements, whose non uniform spacing and length, are the sole parameters available to transcribe the electrical waveform carrying the information to be stored. For reasons inherent in the process of optical read-out by diffraction, the width of the diffractive elements is in the order of one micron. The engraving of a master designed to effect the mass reproduction of records of this kind, can be effected in several steps using a method which consists in successively depositing upon a substrate, a film of photoresist and a thin film of volatilisable material doing duty as a mask. Using this known technique, the starting point is the local irradiation of the volatilisable mask in order to form holes in it, after which, the photoresist is exposed through the resultant perforations. A suitable chemical treatment of the photoresist produces an impression of suitable depth, the counterpart of which can be produced by the electrolytic deposition of a metal having good mechanical strength. The engraving method involves a large number of successive operations since, in order for the master to exhibit the qualities of fineness, depth and strength, it is necessary to successively use a masking material, a photoresist film and a filler metal. The simplification which consists in directly carrying out selective exposure of the photoresist, without the use of a volatilisable mask, gives rise to mediocre results because experience has shown that a concentrated beam of energy yields a finer engraved result when applied to the volatilising of an extremely thin film, than it does when it is used to expose a photoresist having a greater thickness.

To simplify the procedure of engraving a master without sacrificing the fineness which is provided by the volatilising technique, the invention proposes that electrolysis should be used to effect the selective introduction of a filler metal as soon as the operation of volatilisation has resulted in the perforation of a conductive film deposited upon the electrically insulating surface of a substrate. In this fashion, one of the steps in the known process is economised on and at the same time, it is no longer necessary to provide an intermediate film of photoresist.

In accordance with an object of the present invention, there is provided a method of forming a master designed to reproduce upon a record the impression of a track of predetermined width, made up of diffractive elements whose non uniform length and spacing constitute the transcription of a carrier waveform angularly modulated by an electrical signal bearing information, said method comprising the steps of:

selecting a substrate having an electrically insulating smooth face, depositing upon said smooth face a conductive film of residue free volatilisable material, causing the selective volatilisation of said film under the action of a concentrated radiation incident onto said film, and intensity modulated by said carrier waveform; said volatilisation occuring through the entire thickness of said film for forming perforations, electroplating the portions of said film remaining on said substrate to provide a grown layer entirely capping said perforations.

For a better understanding of the present invention and to show how the same may be carried into effect, reference will be made to the ensuing description and the attached figures among which:

Figure 1:
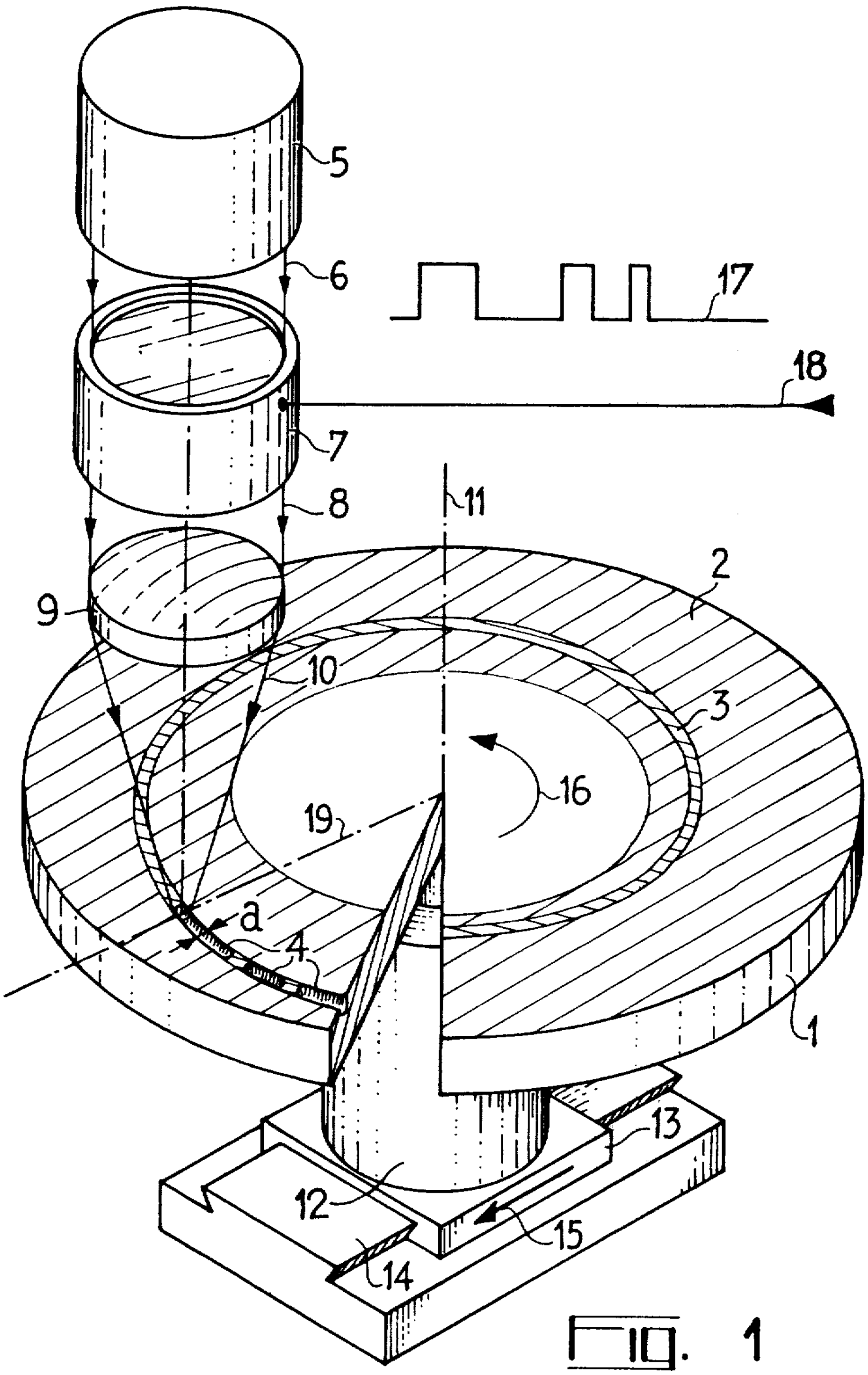
FIG. 1 illustrates the selective volatilisation process in accordance with the invention.

In FIG. 1, by way of non-limitative example, there can be seen a recording device designed to implement the method of the invention. The impression with which we are concerned in this example, is that of a spiral track and it is designed to be reproduced upon a disc record by means of a master with a complementary relief structure, that is to say that a projection or relief formation on the record is intended to correspond with a hollow in the master, and vice versa.

To produce the master required to transfer the impression to the record, it is initially created an electrical waveform 17, angularly modulated by the information bearing signal it is desired to record. This waveform is recorded in the region 2 of the surface of a substrate 1, in the form of a track 3 of spiral form whose pitch has been considerably exaggerated in the FIG. 2. The track 3 has a substantially constant width a; it is made up of a succession of diffractive elements 4 whose non-uniform length and spacing constitute the transcription of the waveform 17. To effect the transcription, on to a fixed point of the region 2 of the substrate a concentrated radiation 10, intensity modulated by the waveform 17, is projected and the substrate is rotated at constant speed about an axis 11 perpendicular to its top face. The rotation of the substrate in the indicated direction (arrow 16) is effected by a drive motor 12 whose stator can displace radially in the direction 15. A guide bed 14 with slideways, and a carriage 12, act as the mounting for the motor 12 and the rotor of the latter supports the substrate. The point of impact of the recording radiation 10 being fixed, it will be seen that the combination of the rotational motion 16 and the translational motion 15, of the substrate 1, makes it possible to describe the track 3 which, it should be remembered, comprises a very large number of turns in the recording region 2. The recording radiation 10 issues from a radiation source constituted, for example, by a laser emitting a coherent beam 6. The beam 6 passes through an electrically controlled intensity modulator 7 whose electrical control input 18 is supplied with the waveform 17 which is to be recorded. The modulated beam 8 emerging from the modulator 7 is received by a projection objective lens 9 which focuses the energy coming from the source 5, on the region 2 of the substrate. During the recording, the recording spot projected by the concentrated beam 10 displaces in the radial direction 19 and, in view of the rotation of the substrate, hollows 4 are produced by volatilisation, in time with the peaks of the waveform 17 which may take the form of a square wave.

Figure 2:
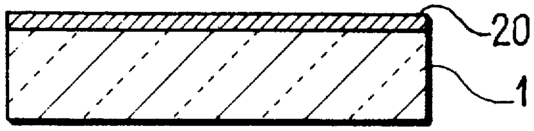
FIGS. 2 to 5 illustrate the steps in the method of the invention, which make it possible to produce a master capable of reproducing projecting diffractive elements.

In FIG. 2, the substrate 1 can be seen prior to the start of recording. It is coated on its top face with a thin film 20 of a material which can be volatilised under the action of the heat locally developed by the recording beam 10.

In accordance with the invention, the residue free volatilisable film 20 is deposited upon a smooth electrically insulating surface. Under these circumstances, the substrate may be constituted either by an insulating material such as glass or by an arbitrary other material coated with a thin insulating film. The thickness *e* of the film 20 should be less than the width *a* of the diffractive elements it is desired to engrave, and generally ranges between 250 and 1,000 A units when the width *a* is in the order of one micron. The volatilisable material constituting the film 20 can be a metal having a low vaporisation temperature, which will sublimate under the action of the heat introduced by the recording radiation 10. To this end, bismuth deposited by a process of vaporisation can be used but it is equally possible to employ alloys thereof and also other metals such as aluminium or manganese.

It is essential that that face of the film 20 which is exposed to the recording radiation should be electrically conductive and this is something which is automatically achieved if a metallic film is used.

It is also possible to utilise a non-metallic residue free volatilisable material to form the film 20. For example, a copolymer which is capable of decomposition into its monomers under the action of the heating developed by the recording radiation, can be used. By way of non-limitative example, the film, 20 may be composed of a thin film of methylpolymethacrylate to whose external surface a very thin gold film has been applied by a process of vapour deposition, in order to render it conductive. To accentuate the absorption of the recording radiation by the film 20, it is a good idea to incorporate a dye such as eosin, into the copolymer used.

By way of non-limitative example, if an argon laser is used to form in the film 20, perforations one micron in width, then it has been found experimentally that using bismuth in a thickness *e* of 500 A units, an exposure time of one microsecond is required in order to produce volatilisation with a power of 5 mW, when the recording beam is focused by a microscope objective lens having a magnification of 16 and an aperture of 0.3. The focusing tolerance is such that variations in the distance of the substrate from the lens, of up to $\mp$ 20 microns, are admissible whilst retaining the engraving characteristics. Using a projection objective lens of higher magnification and larger aperture, the power of the recording radiation can be reduced but the tolerance on the focusing is then tighter.

Figure 3:
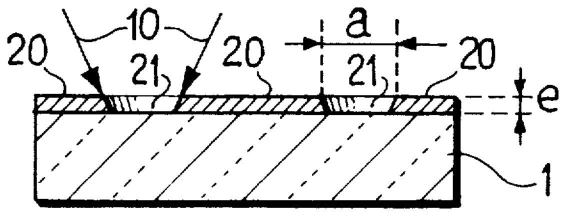

In FIG. 3 the phase of volatilisation of the film 20 can be seen. Under the influence of the heat liberated in the film 20, the recording beam 10 completely volatilises the portions 21 of said film and this leaves behind perforations of width *a*, exposing the electrically insulating surface of the substrate 1. What is left of the film 20 after the recording operation retains its conductive surface character and it is possible to utilise this perforated electrode as a cathode for the deposition by electrolysis, of a metal 22.

Figure 4:
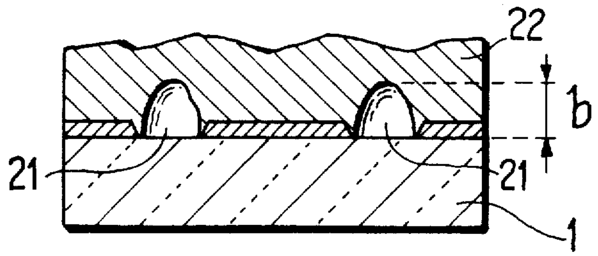

As FIG. 4 shows, the electroplating cannot extend to the exposed areas of the substrate 1 since these latter are insulating in nature. Electrolytic deposition starts at the conductive portions of the film 20 and tends progressively to overflow over the perforations 21 until, as the thickness continues to build up, the hollows located above the non-conductive portions 21 of the substrate, are closed off. The height *b* of the caps which develop above the perforations, is in the same order of magnitude as the width *a* thereof.

Figure 5:
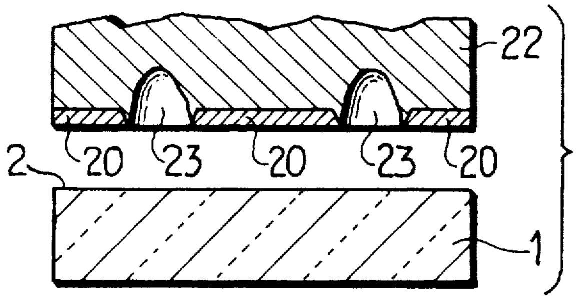

As FIG. 5 shows, there remains nothing more but to detach the substrate 1 from the assembly 20, 22 in order to obtain a master the hollows 23 in which are capable of reproducing upon a record, projecting (relief) diffractive elements.

Figure 6:
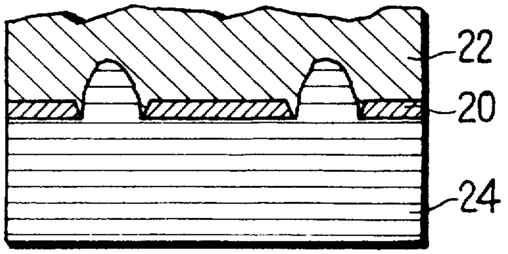
FIG. 6 illustrates an additional step of the method illustrated in FIGS. 2 to 5, by which it is possible to obtain a master capable of reproducing hollow diffractive elements.

If it is desired to reproduce upon a record, hollow diffractive elements, the master 20, 22, 23 of FIG. 5 can, in its turn, be used as cathode in order to produce electrolytic deposition of metal 24 which, as FIG. 6 shows has a complementary relief form.

On detaching the deposit 24 from the elements 20, 22 having served as cathode, a replica is obtained which can be used to form hollow diffractive elements by a pressing operation. The electrolytic deposits of FIGS. 4 to 6 can, by way of non-limitative example, be constituted by nickel. The thickness of these deposits should be sufficient to entirely cap the perforations in the volatilisable conductive film. Of course, the deposition operation could be continued beyond this stage in order to secure good rigidity in the master.

What we claim is:

1. A method of forming a master designed to reproduce upon a record the impression of a track of predetermined width, made up of diffractive elements whose non uniform length and spacing constitute the transcription of a carrier waveform angularly modulated by an electrical signal bearing information, said method comprising the steps of:

selecting a substrate having an electrically insulating smooth face, depositing upon said smooth face a conductive film of residue free volatilisable material, causing the selective volatilisation of said film under the action of a concentrated radiation incident onto said film, and intensity modulated by said carrier waveform; said volatilisation occuring through the entire thickness of said film for forming perforations, electroplating the portions of said film remaining on said substrate to provide a grown layer entirely capping said perforations.

2. A method as claimed in claim 1, wherein the assembly comprising said grown layer and the non-volatilised portions of said film, is detached from said substrate; said assembly constituting said master.

3. A method as claimed in claim 1, wherein the assembly comprising said grown layer and the non-volatilised portions of said film, is detached from said substrate; a further electrolytic deposit being carried out on said assembly in order to produce said master after the separation of said further electrolytic deposit from said grown layer.

4. A method as claimed in claim 1, wherein said substrate is cut from an electrically insulating material.

5. A method of manufacture as claimed in claim 1, wherein said substrate is cut from an electrically conducting material and overlayed with an electrically insulating coating.

6. A method of manufacture as claimed in claim 1, wherein said film is metallic.

7. A method as claimed in claim 6, wherein said film is constituted by a bismuth deposit.

8. A method as claimed in claim 1, wherein said conductive film comprises: a layer of copolymer material undergoing dissociation in its monomers under the heating action of said radiation, and a metallic deposit lying on the face of said layer exposed to said radiation.

9. A method as claimed in 8, wherein said copolymer is methylpolymethacrylate and incorporates a dye; said dye being absorbant vis-a-vis said radiation; said metallic deposit being constituted by a thin film of gold deposited by vaporisation.

10. A method as claimed in claim 1, wherein said grown layer is a nickel deposit.

* * * * *